No. 660,722. Patented Oct. 30, 1900.
A. CRUICKSHANKS & A. SCRIVENOR.
FEED WATER AND WATER LEVEL REGULATOR.
(Application filed Mar. 3, 1900.)
(No Model.) 3 Sheets—Sheet 1.
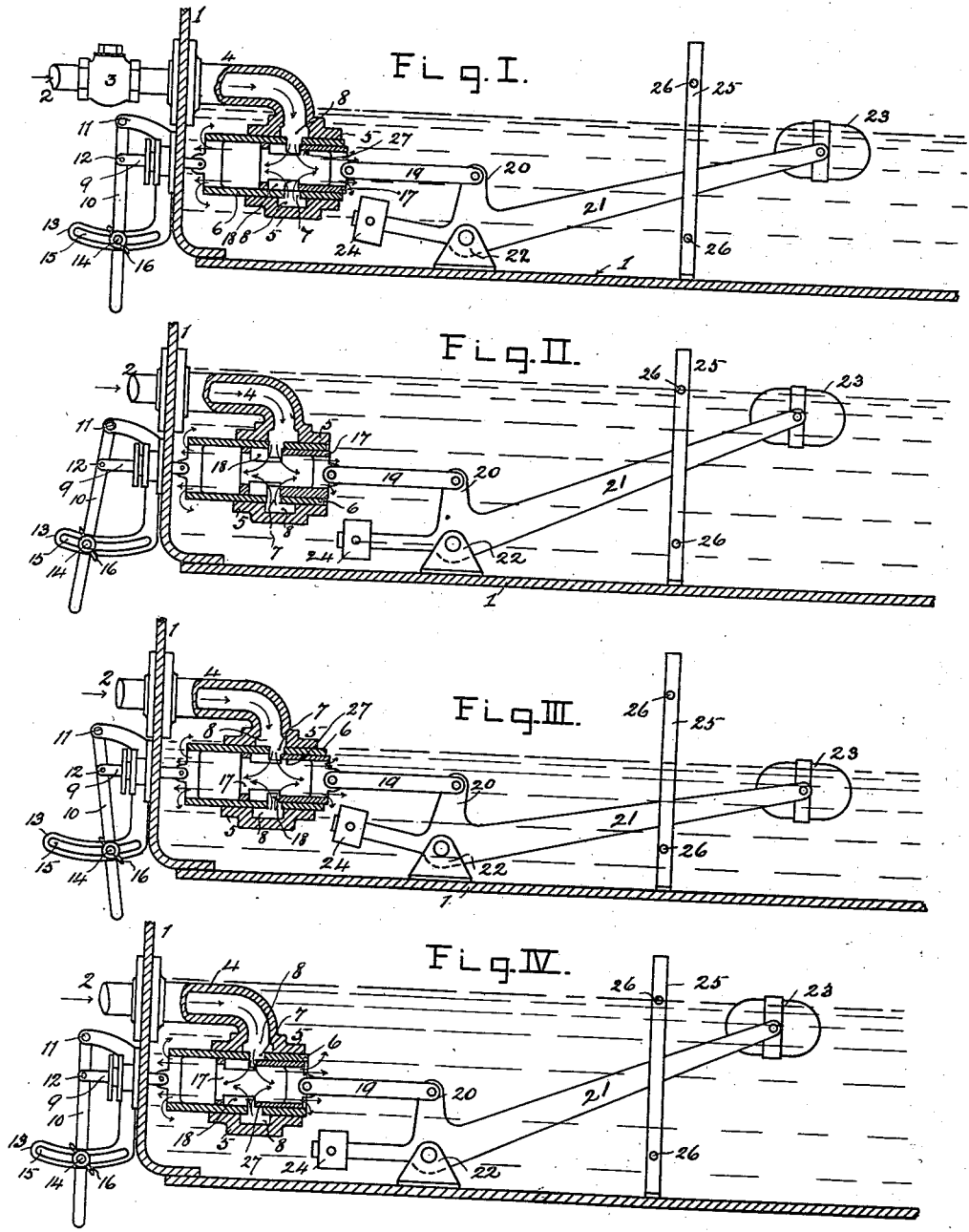
WITNESSES:
INVENTORS
Alexander Cruickshanks,
Arthur Scrivenor.
BY
their ATTORNEYS

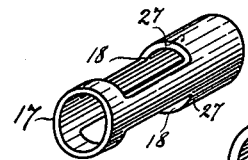
Fig. VIII.
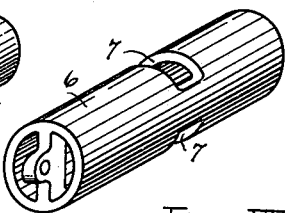
Fig. VII.
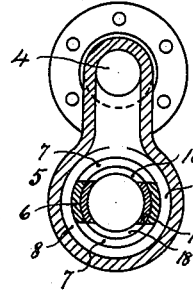
Fig. V.
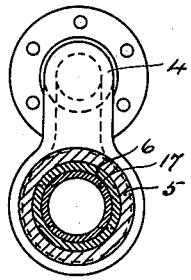
Fig. VI.
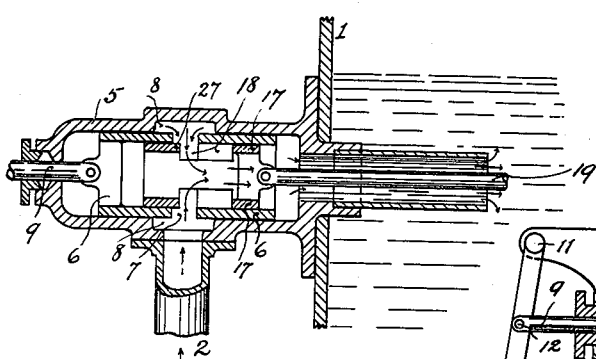
Fig. IX.    Fig. X.
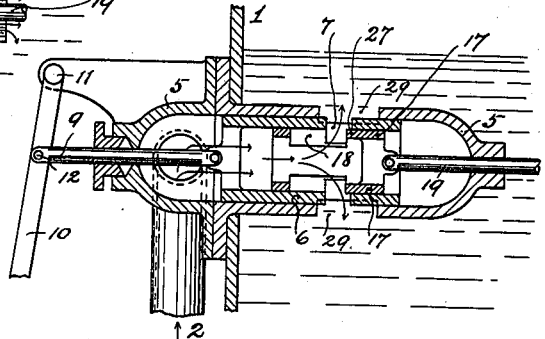
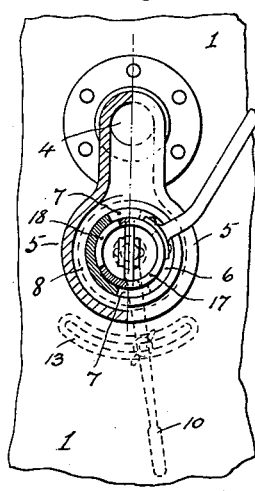
Fig. XII.
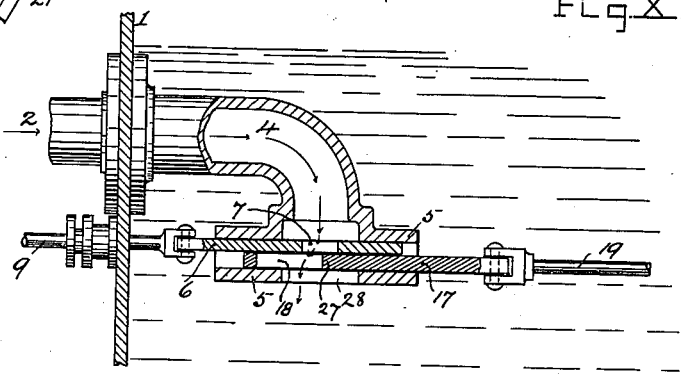
Fig. XI.

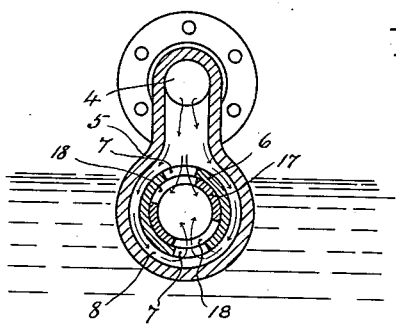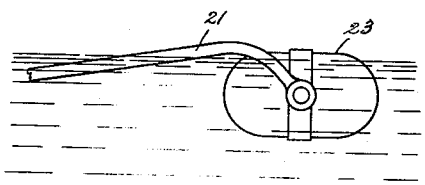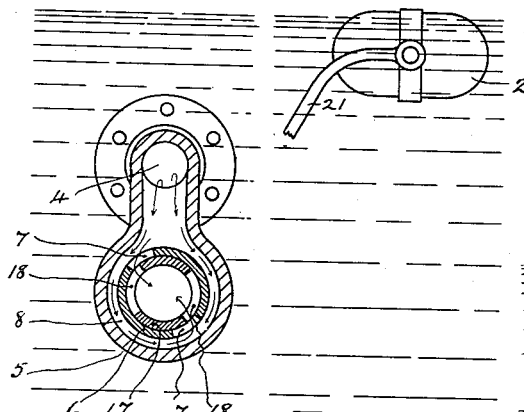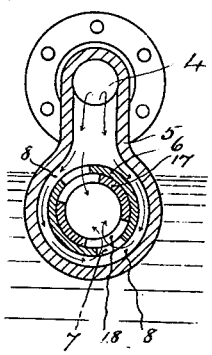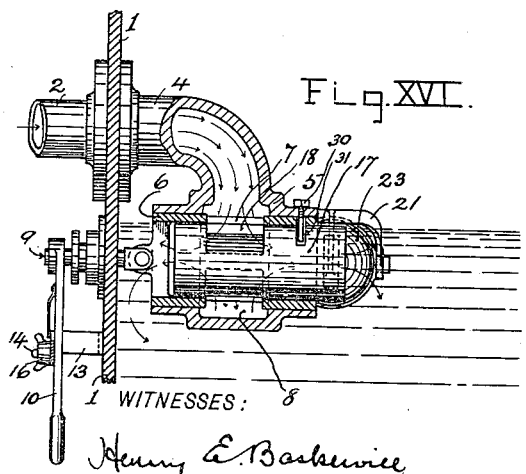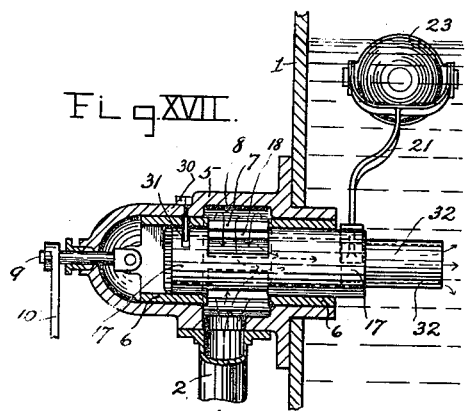

UNITED STATES PATENT OFFICE.

ALEXANDER CRUICKSHANKS AND ARTHUR SCRIVENOR, OF RICHMOND, VIRGINIA.

FEED-WATER AND WATER-LEVEL REGULATOR.

SPECIFICATION forming part of Letters Patent No. 660,722, dated October 30, 1900.

Application filed March 3, 1900. Serial No. 7,202. (No model.)

*To all whom it may concern:*

Be it known that we, ALEXANDER CRUICKSHANKS and ARTHUR SCRIVENOR, citizens of the United States of America, and residents of Richmond city, State of Virginia, have invented certain new and useful Improvements in Feed-Water and Water-Level Regulators, of which the following is a specification.

Our invention relates to feed-regulators, and particularly to feed-regulators for boilers, tanks, vats, &c.; and it has for its object the provision of means not only for regulating the inflow of the liquid to the receptacle, but also for adjusting or regulating the level of the liquid within the receptacle, and that without interfering with the proper supply of the liquid to the receptacle.

As we have said above, our regulator can be used with many different kinds of receptacles for liquids; but to aid us in making its use and operation clear we will describe it as applied to a steam-boiler for the purpose of automatically controlling the supply of feed-water and of regulating the height of the water-level. It should be borne in mind that the controlling of the water-level and the controlling of the feed are two separate and distinct matters, and the former is, if not quite, nearly as important a matter as the latter. The importance of the latter is of course well known to every one; but the importance of the former is not so well known. It is a fact that all boilers do not steam alike, some steaming better at a high and others at a low water-level. Then again, given a certain boiler, some firemen are more successful than others when working with a certain water-level. There are occasions when it is expedient to work with a low water-level and others again when it is necessary to adopt a much higher one, and that on the same boiler. These are matters which are well known to engineers, firemen, and water-tenders and which demand a great deal of attention in practice. A most important point, which must not be lost sight of, is that no matter what water-level, whether high, medium, or low, be adopted in any particular case, the free control of the supply of feed-water to the boiler must not be interfered with. Regulators have heretofore been constructed with the object of controlling the supply of water to the boiler, and others have been constructed with a view to controlling the feed and also to control the water-level; but in the latter type of regulators the control of the water-level is frequently effected at the expense of a perfect control of the feed—that is to say, when working at one water-level the control of the feed extends from "full opening" to "closed;" but when we adjust the regulator so as to obtain another water-level we may find that the control of the feed is limited—in other words, that we cannot get full opening. This is not only a disadvantage, but a danger. Our regulator overcomes this disadvantage, as will be explained in the following description of the drawings which accompany and form a part of this specification, and in which like numerals refer to like parts in the different views.

In the drawings, Figure I is a vertical section through the regulator and showing it applied to the boiler. Figs. II, III, and IV are vertical sections through the regulator, showing certain parts in positions different to those in which they are shown in Fig. I. Fig. V is a transverse section taken through the center of the regulator. Fig. VI is a transverse section taken at one end of the regulator. Fig. VII is a detail view in perspective of the adjustable sleeve or slide. Fig. VIII is a detail view in perspective of the valve. Figs. IX, X, and XI show in section modified constructions of the regulator. Figs. XII to XVII, inclusive, show the same regulator, but with the sleeve and valve arranged to operate with a rotary instead of with an endwise movement, and of these views Fig. XII shows a half end elevation of and a half transverse section through the regulator. Fig. XIII is a broken view showing the regulator in transverse section. Figs. XIV and XV are similar to Fig. XIII, but show the parts of the regulator in different positions. Figs. XVI and XVII are views, partly in longitudinal section, respectively showing the application of the regulator to the interior and to the exterior of a boiler.

In Fig. I, 1 represents a part of the shell of a boiler, in this case an upper drum of a water-tube boiler. 2 is the external feed-pipe, which may be provided with a check-valve 3. 4 is the internal feed-pipe, which terminates in the casing 5. Adjustable in this casing is the sleeve 6, a detail view of which is shown in Fig. VII. We prefer to make this piece in the form of a hollow cylinder or sleeve, though, as will be shown hereinafter, it may be made in other forms.

The sleeve and the valve may be operated in two ways—that is, they may be given an endwise motion or they may be rotated. We will first describe and illustrate our regulator arranged so that the sleeve and the valve may be given an endwise motion, as this construction is perhaps more easily shown in the drawings and will therefore, perhaps, be more readily understood.

In the sleeve 6, which is open at both ends, are cut one or more ports 7 7, situated at about the middle of its length. The area of these ports should not be less, and preferably a little greater, than the area of the feed-pipe of the boiler. It will be seen on referring to Figs. I, V, and VI that the casing 5 forms an annular chamber 8, which extends around the sleeve 6, thus forming a channel through which the feed-water can reach both of the ports 7 7. In cases where only small port area is necessary it is better to retain the annular chamber 8 and to use two small ports—one on the top and one on the bottom of the sleeve 6—than it is to do away with the annular chamber and use one port of sufficient size on top of the sleeve, for by retaining the annular chamber and using the two small ports we equalize the pressure of the feed-water all around the sleeve and so practically balance it, rendering it easier to move and less likely to wear.

Referring again to Fig. 1, it will be seen that the length of the ports 7 7 is considerably less than the length of the annular chamber 8. Consequently the sleeve 6 can be adjusted at any point within a length equal to the difference between the length of the ports 7 7 and the annular chamber 8 and yet present a full port-opening to the said chamber 8. Our meaning will be readily understood on referring to Figs. I, II, and III, wherein the sleeve 6 is shown as having been set so that the ports 7 7 are respectively in the center, at one end, and at the other end of the chamber 8. It is clear that the sleeve 6 can be set in the positions shown in Figs. II and III and in any intermediate position and (and this is a point to which we wish to call particular attention) still present a full port-opening to the chamber 8.

The adjusting of the sleeve 6 is effected by means of a rod 9, attached to one end of it and passing through the shell of the boiler, leakage at the point where it passes through the shell of the boiler being prevented, preferably, by the use of a stuffing-box. The rod 9 may be given motion endwise by a lever preferably or by means of a hand-wheel having in its hub a screw-thread engaging a similar thread on the rod 9. The former means we have illustrated as showing more clearly than any other the adjustment of the sleeve 6. The lever 10, pivoted to a bracket at 11, is attached to the rod 9 at 12.

13 is an arc on which may be made marks, the proximity of the lever 10 to any one of these marks indicating the position of the sleeve 6 and also, as will be seen hereinafter, the position of the water-level in the boiler. The lever 10 can be locked in position by means of a stud 14, which is attached to the lever 10, and, passing through the slot 15 in the arc 13, has at its farther end a jam-nut 16.

Within the sleeve 6 is the valve 17, which may be similar in construction to the sleeve—that is, it may also be a hollow cylinder. In this valve 17 and on opposite sides of it there are ports 18 18, corresponding with, but of greater length than, the ports 7 7 in the sleeve 6. The valve 17, which is shown in detail in Fig. VIII, slides within the sleeve 6 and is connected at one end, by means of the link 19, to the arm 20 of the float-lever 21. This lever 21, pivoted on a bracket 22, which may be a part of the casing 5 or which may be attached to the boiler-shell, as shown, carries at one end the float 23, the weight of the float preferably being nearly balanced by means of a counterweight 24, attached to the other end of the lever 21.

25 is a guide consisting of two vertical standards, between which the lever 21 can rise and fall. The principal object of this guide is to prevent the float 23 and the lever 21 from swinging laterally, which they would sometimes have a tendency to do if the boiler in which they were fitted was a locomotive or marine boiler. Too great a vertical swing of the float is checked by the pins 26, fixed in the guide 25. As the float 23 rises and falls with the rise and fall of the water-level within the boiler the valve 17 will be caused to slide within the sleeve 6.

We will now describe the manner in which our regulator operates to control the inflow of the feed-water.

Suppose that we are working with a medium water-level. The sleeve 6 will then be set as shown in Fig. I. Assuming that the water has fallen some distance below the proper level, the float 23, falling with the water, has drawn back the valve 17 until it has opened the ports 7 7 in the sleeve 6, (see Fig. I,) thus permitting the feed-water to flow through the ports 7 7 and 18 18 and, as indicated by the arrows, through the body of the valve into the interior of the boiler. As the water, and consequently the float, rises the valve 17 will gradually close the ports 7 7 in the sleeve 6, thus checking the flow of the feed-water into the boiler. (See Fig. IV.) As the water rises and the valve closes the latter will arrive at a point where the length of the ports 7 7 left open will be sufficient to admit in a given time a quantity of water equivalent to the quantity of water evaporated in the boiler in that time. The water in the boiler will then be kept practically at a constant level. If this level tends to fall, the float 23 will cause the valve 17 to lengthen the opening of the ports 7 7, and so admit more feed-water. If the evaporation is checked and the water-level tends to rise, the rising float will cause the valve 17 to shorten the opening of the ports 7 7, and so check the inflow of the feed-water until the evaporation again becomes normal.

In Fig. IV we have shown the sleeve 6 set for medium water-level and the valve 17 as having become adjusted by the float 23 so that the rate of inflow of feed-water through the ports 7 7 and 18 18 is equivalent to the rate of evaporation within the boiler. Assuming that the conditions under which we are now working are those shown in Fig. IV, suppose that we wish to use a higher water-level. We set the sleeve 6 toward or in the position shown in Fig. II. It will be seen that the water and the float 23 must rise to a higher level in order to cause the valve 17 to check the flow of water through the ports 7 7 in the sleeve 6. Consequently water will continue to flow into the boiler until the water in the boiler and the float 23 have reached the higher level, when the inflow of water will be checked by the shortening of the ports 7 7 by the valve 17. Again, suppose that we wish to use a lower water-level than either of those with which we have been working. We set the sleeve 6 toward or in the position shown in Fig. III. The ports 7 7 will now be closed by the valve 17, and, evaporation proceeding, the falling water will cause the float 23 to operate the valve to uncover the ports 7 7, when water will again flow into the boiler and will continue to do so until the balance of the rate of the inflow and the rate of evaporation is again restored. The water in the boiler will then be at the desired level. In Figs. I, II, and III we have shown the ports 7 7 in the sleeve 6 as full open for the sake of clearness and to illustrate the fact that we can always obtain a full opening of port with different water-levels. In practice the valve takes an intermediate position, as indicated in Fig. IV, for the reasons and with the result stated above.

It will now be seen that we have a regulator which not only enables us to perfectly control the feed to a boiler, &c., but which also, while preserving the full control of the feed, enables us to work with a high or a low or any intermediate water-level.

We do not confine ourselves to the exact construction of or method of applying our regulator as described above. Other constructions can be used without departing from the principle. For instance, the regulator can be fitted to the outside or to the inside or the top or the bottom or the side of a boiler or other receptacle for liquids. Fig. IX shows its application on the outside of a boiler, Fig. X partly inside and partly outside. In each of these figures the arrows indicate the course of the water. It should be noted that it is not necessary that the water should always flow from the outside to the inside of the sleeve 6 and valve 17. Some constructions admit of this direction of flow, and some—for instance, that one shown in Fig. X—of the reverse. In Fig. X it will be seen that the feed-water enters the casing 5 by the pipes 2, passes into the sleeve 6 and valve 17, through the ports 18 18 and 7 7, and through the ports 29 29 in the casing 5 into the boiler.

In some cases it may be necessary to suspend the fulcrum 22 of the float-lever 21 from the top of the boiler-drum instead of attaching it to the bottom of the drum, as shown in Figs. I to IV. The short arm 20 of the float-lever would then extend below the fulcrum 22 instead of above it, and the direction of the swing of the arm 20 when the float falls being then reversed it would be necessary to turn the valve 17 around end for end. The valve is shown so turned around in Fig. IX, wherein it will be noticed that the part 27 of the valve, which acts as a cut-off to the ports 7 7 in the sleeve 6, is to the left of the ports 7 7 instead of to the right of them, as shown in Figs. I, II, III, IV, and X.

The regulator can also be constructed as shown in Fig. XI, wherein the sleeve 6 and the valve 17 are in the form of flat plates or slides sliding within the casing 5, the casing in this case being rectangular instead of cylindrical and having an opening or port 28 in the under side for the exit of the water. The feed-water would then pass through the ports 7 and 18 and through the port 28 into the boiler; but this form, though simple, has its disadvantages. In the first place the flat slide and valve are harder to fit and more apt to jam than are those which are cylindrical and, secondly, the pressure of the feed-water on the upper face of the slide 6 being unbalanced will render the slide harder to adjust and more liable to wear. Again, as hereinbefore stated, the sleeve 6 and the valve 17 may be given a rotary movement, as shown in Figs. XII to XVII, inclusive, instead of an endwise movement, as shown in Figs. I to XI, inclusive, and to obtain this rotary movement we have to make very few changes, and those only of minor details, in the regulator as hereinbefore described. For instance, the lever 10 is arranged as a handle with which to rotate the rod 9 and the sleeve 6. The float-lever 21 can be arranged to rotate the valve 17 by means of a bell-crank, or, as shown in Figs. XII and XVI, it could be attached directly to the end of the valve, lying at right angles to the axis of the valve instead of in line with it, as shown in Fig. I.

In Figs. XII to XVI, inclusive, 4 is the feed-inlet; 5, the casing; 7 7, the ports in the sleeve; 8, the annular chamber in the casing 5; 17, the valve; 18 18, the ports in the valve; 21, the float-lever, which may be connected to the valve 17 by means of a bell-crank or which may be attached to the valve itself, (see Figs. XII to XVI,) and 23 is the float.

In Figs. XII and XVI, 9 is the sleeve-adjusting rod; 10, the lever, and 13 the arc, having the slot 15. 14 is the stud fixed in the lever 10 and passing through the slot 15 in the arc 13, and 16 is the jam-nut by which the lever 10 is secured in position after setting the sleeve. The lever 10, arc 13, &c., and the manner of connecting the float-lever 21 to the valve 17 are not shown in Figs. XIII, XIV, and XV to avoid complication of the drawings. In the rotating sleeve and valve the length of the ports 7 7 and 18 18 is measured on the circumference and the width of the said ports on the axis of the said sleeve and valve, while in the case of the sliding sleeve and valve the length of the said ports is measured on the axis and their width on the circumference of the said sleeve and valve. In Fig. XVI, 30 is a pin or tap-bolt fixed in the casing 5, and which, passing through slots 31 in the sleeve 6 and valve 17, prevent the said sleeve and valve from being accidentally displaced—that is, moved lengthwise in and perhaps withdrawn from the case 5—but which at the same time does not interfere with their being rotated. If it is found to be desirable, the slot 31 in the valve 17 can be cut of such a length and so located in the valve that the pin 30 will act as a stop to limit the rotation of the valve, and consequently the range of rise and fall of the float; but of course the rotation of the valve and the range of rise and fall of the float can be limited by means of pins set in guides similar to those shown at 26 in Figs. I to IV, inclusive. In Fig. XII the sleeve 6 is shown as set for a moderately high water-level, and the valve 17 has been rotated by the rising float 23 until the ports 7 7 in the sleeve 6 are nearly closed by the valve 17. If the rate of evaporation is now equal to the rate of inflow of the feed through the ports 7 7, the float 23 and the valve 17 will remain in the position shown. If evaporation is now checked, the water-level and the float 23 will begin to rise, thus causing the valve 17 to close the ports 7 7 in the sleeve 6 still more and so check the inflow of the feed, or if the evaporation increases rapidly the water-level and the float 23 will begin to fall, thus causing the valve 17 to open the ports 7 7 in the sleeve 6 until by admitting more feed-water the fall of the water-level is checked. This is what takes place in practice; but for the sake of illustration let us suppose that starting with the parts of the regulator in the positions shown in Fig. XII the water-level and the float 23 rapidly fall to the level shown in Figs. XIII and XVI. It will now be seen that the ports 7 7 in the sleeve 6 are unobstructed by the valve 17— that is to say, they are full open—and offer a free passage for the inflow of the feed-water. It is of course supposed that the feed pumps or injectors, or whatever means of supplying water to the boiler is employed, are set so that the maximum feed is a little more than the maximum evaporation. We will now suppose, for the sake of further illustration, that with the parts of the regulator in positions shown in Figs. XIII and XVI we wish to set the regulator to high water-level. The sleeve 6 is turned by means of the lever 10 and the rod 9 until it is in the position shown in Fig. XIV. The ports 7 7 in the sleeve 6 are still full open and water flows rapidly into the boiler until raising the water-level, and consequently the float 23, the valve 17 is rotated to the position shown in Fig. XV. The valve 17 now obstructs the ports 7 7 in the sleeve 6, leaving an opening sufficient to allow of a rate of inflow of feed-water equivalent to the rate of evaporation within the boiler.

Fig. XVII illustrates a manner of attaching the regulator in which the sleeves 6 and the valve 17 are arranged to be rotated to the exterior of the boiler. In this figure, 32 is a piece of pipe attached to the delivery end of the valve, the purpose of this pipe being merely to conduct the incoming water well into the boiler. Such pipes are generally used in practice. It will be seen from Figs. XII to XVII that some advantages which the rotary movement of the sleeve and valve gives us are the greater simplicity of the connections, the small space taken up, and the practically unlimited range of water-levels over which we have control, if such a range is desirable, for it is evident that the sleeve 6 can be rotated through three hundred and sixty degrees and yet present a full port-opening to the water in the chamber 8. As a matter of fact, such a range is not necessary in the case of steam-boilers. The range of the water-levels obtained in the case of the regulators having the sliding valve and sleeve is more than enough for all practical purposes and is only dependent on the proportions of the chamber 8 and upon the ratio of the float-lever.

In the claims we have used the term "working level" to designate the level to which we desire the fluid within the receptacle to rise or fall or on which we desire the fluid to remain steady—that is to say, a high level, a low level, a medium level, and so on. For instance, suppose that in the case of a steam-boiler we are working with a high water-level and wish to work with less water in the boiler— that is, at a lower level. This new level is the new working level.

We have now described our invention as applied to a steam-boiler; but its application and its advantages when applied to locomotives, water-tanks, oil-tanks, vats, &c., will be readily understood.

Having now described our invention, what we claim, and desire to protect by Letters Patent of the United States, is—

1. The combination of a feed-inlet, a sleeve adjustable in the feed-inlet and having a port or ports to allow the passage of the feed through the sleeve, a valve for controlling the flow of the feed through the port or ports in the sleeve, and means for automatically operating the valve.

2. In a feed and fluid-level regulator, the combination of a feed-inlet casing, a sleeve for controlling the position of the working level of the fluid, the said sleeve being adjustable in the inlet-casing and having a port or ports for the passage of the feed from the inlet-casing through the wall of the sleeve, a valve for controlling the flow of the feed through the sleeve to the interior of the receptacle, a float, and means for connecting the float with the valve so that the float may control the action of the said valve.

3. The combination of a feed-inlet, a sleeve adjustable in the feed-inlet and having a port or ports for the passage of the feed through the sleeve, a valve adapted to control the flow of the feed through the ports in the sleeve, the said sleeve and valve operating together to fully control the flow of the feed when working at different levels of fluid within the receptacle, and means for automatically operating the valve.

4. The combination in a fluid-feed and fluid-working-level regulator of a valve for controlling the flow of the feed through the regulator, and a sleeve having ports for the passage of the fluid through it, the said valve being automatically operated by the rise and fall of the fluid within the receptacle to control the flow of the fluid through the ports in the sleeve, and the sleeve being adjustable so as to alter the position of its ports to change the working level of the fluid within the receptacle.

5. The combination in a fluid-feed and fluid-working-level regulator of a valve for controlling the flow of the feed through the regulator, and a ported sleeve adjustable with regard to the valve to change the working level of the fluid within the receptacle.

6. In a fluid-feed and fluid-working-level regulator, the combination of a feed-inlet, a valve for regulating the feed, and means located between the feed-inlet and the valve and adjustable in relation to the feed-inlet and the valve to change the operative relation of the valve of the feed-inlet.

7. In a fluid-feed and fluid-working-level regulator, the combination of a feed-inlet, a valve for regulating the feed, and a ported sleeve located between the feed-inlet and the valve and adjustable in relation to the feed-inlet and the valve to change the operative relation of the valve of the feed-inlet.

8. In a fluid-feed and fluid-working-level regulator, the combination of a feed-inlet for admitting fluid to or discharging fluid from a receptacle, an automatically-operated valve, means for automatically operating the valve, and a ported sleeve located between the feed-inlet and the valve and having a port or ports to allow the fluid to pass through it and adjustable in relation to the valve, and which together with the automatically-operated valve controls the flow of the fluid to or from the receptacle and also controls the position of the working level of the fluid within the receptacle.

9. In a fluid-feed and fluid-working-level regulator, the combination of a feed-inlet, a sleeve having ports for the passage of the fluid through its wall and adjustable to change the relative position of its ports and of a valve so as to change the working level of the fluid within the receptacle, a valve controlling the passage of the fluid through the ports in the sleeve and arranged to be operated automatically by the rise and fall of the fluid within the receptacle, and means for automatically operating the valve.

10. In a fluid-feed and fluid-working-level regulator, the combination of a feed-inlet, a sleeve having ports for the passage of the fluid through its wall and adjustable to change the relative position of its ports and the ports of a valve so as to change the working level of the fluid within the receptacle, a balanced valve having ports and arranged to be operated automatically by the rise and fall of the fluid within the receptacle to control the flow of the fluid through the ports in the sleeve, and means for operating the valve automatically.

11. In a fluid-feed and fluid-working-level regulator, the combination of a feed-inlet, a ported sleeve rotatable in the feed-inlet to change the working level of the fluid within the receptacle, and a ported valve rotatable in the sleeve and arranged to be operated automatically by the rise and fall of the fluid in the receptacle to control the flow of the fluid through the ports in the sleeve.

12. In a fluid-feed and fluid-working-level regulator, the combination of a feed-inlet, a rotatable ported balanced valve, means for automatically rotating the said valve by the rise and fall of the fluid within the receptacle to control the flow of the fluid through the regulator, and a ported sleeve located between the feed-inlet and the valve and adjustable to change the relative position of the ports in the sleeve and in the valve so as to change the working level of the fluid within the receptacle.

13. In a fluid-feed and fluid-working-level regulator, the combination of a feed-inlet having an annular chamber 8, an adjustable sleeve 6 having ports 7 in communication with the annular chamber 8, a valve 17 having ports 18 and rotatable automatically by the rise and fall of the fluid within the receptacle to control the flow of the fluid through the ports 18 and 7, and which together with the sleeve 6 control the position of the working level of the fluid within the receptacle.

Signed by us at Richmond, Virginia, this 14th day of February, 1900.

ALEXANDER CRUICKSHANKS.
ARTHUR SCRIVENOR.

Witnesses:
C. W. THROCKMORTON,
ALEX. STUART GIBSON.